US012521085B2

United States Patent
Liu et al.

(10) Patent No.: US 12,521,085 B2
(45) Date of Patent: Jan. 13, 2026

(54) APPARATUS AND METHODS FOR QUANTIFYING THE BIOMECHANICAL ATTRIBUTES OF THE CORNEA AND THE ANTERIOR SCLERA

(71) Applicant: OHIO STATE INNOVATION FOUNDATION, Columbus, OH (US)

(72) Inventors: Jun Liu, Columbus, OH (US); Sunny Kwok, Cincinnati, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 18/674,055

(22) Filed: May 24, 2024

(65) Prior Publication Data

US 2024/0389973 A1    Nov. 28, 2024

Related U.S. Application Data

(60) Provisional application No. 63/569,501, filed on Mar. 25, 2024, provisional application No. 63/504,200, filed on May 24, 2023.

(51) Int. Cl.
*A61B 8/10* (2006.01)
*A61B 8/00* (2006.01)

(52) U.S. Cl.
CPC .............. *A61B 8/10* (2013.01); *A61B 8/485* (2013.01); *A61B 8/5223* (2013.01); *A61B 8/5276* (2013.01)

(58) Field of Classification Search
CPC ......... A61B 8/10; A61B 8/485; A61B 8/5223; A61B 8/5276; A61B 8/08
See application file for complete search history.

(56) References Cited

U.S. PATENT DOCUMENTS

| 2002/0077797 A1* | 6/2002 | Hall | A61B 8/10 703/11 |
| 2013/0211285 A1* | 8/2013 | Fuller | A61B 5/031 600/561 |
| 2016/0270656 A1* | 9/2016 | Samec | A61B 5/398 |
| 2020/0315570 A1* | 10/2020 | Ambrozinski | A61B 5/0051 |
| 2020/0329958 A1* | 10/2020 | Larin | A61B 3/10 |

OTHER PUBLICATIONS

Kwok, et al., Heartbeat-Induced Corneal Axial Displacement and Strain Measured by High Frequency Ultrasound Elastography in Human Volunteers, Trans Vis Sci Tech. 2020; 9(13):33.
(Continued)

*Primary Examiner* — Bo Joseph Peng
(74) *Attorney, Agent, or Firm* — Meunier Carlin & Curfman LLC

(57) ABSTRACT

Ultrasound images of a patient's cornea or sclera include speckles that can be tracked between frames to measure tissue displacement, such as during a heartbeat that changes intraocular pressure. Speckle tracking techniques and noise reduction filters allow for the strain within the tissue to be calculated and compared to known thresholds to determine stiffness. These measures will be used to diagnose keratoconus and other ophthalmology disorders at an early stage, as an abnormally low stiffness or heterogeneity in stiffness will indicate high risk for progression of certain diseases.

7 Claims, 12 Drawing Sheets

(56) References Cited

OTHER PUBLICATIONS

Kwok S, Pan X, Liu W, Hendershot A, Liu J (2022) High-frequency ultrasound detects biomechanical weakening in keratoconus with lower stiffness at higher grade. PLoS ONE 17(7):e0271749. https://doi.org/10.1371/journal.pone.0271749.

Tang J, Liu J, Ultrasonic Measurement of Scleral Cross-Sectional Strains During Elevations of Intraocular Pressure: Method Validation and Initial Results in Posterior Porcine Sclera. Journal of Biomechanical Engineering, Sep. 2012, vol. 134, pp. 091007-1 to 091007-10.

Clayson, et al., 3D Characterization of Corneal Deformation Using Ultrasound Speckle Tracking, J. Innov. Opt. Health Sci. Nov. 2017; 10(6); doi:10.1142/S1793545817420056.

Telemed Inc., Telemed Ultrasound for Science and Research; RF Data Access Brochure; Apr. 2020.

Blessberger and Binder; Two Dimensional Speckle Tracking Echocardiography: Basic Principles, Heart, 2010; 96: 716-722; doi 10.1136/hrt.2007.141002.

Mor-Avi et al., Current and Evolving Echocardiographic Techniques for the Quantitative Evaluation of Cardiac Mechanics: ASE/EAE Consensus Statement on Methodology and Indications Endorsed by the Japanese Society of Echocardiography; European Journal of Echocardiography; 2011, 12, 167-205; doi: 10.1093/ejechocard/jer021.

Lakshmanadoss, Umashankar, editor. Echocardiography in Heart Failure and Cardiac Electrophysiology. InTech, 2016 Crossref, doi:10.5772/61427; Oct. 19, 2016 (Chapter 5 by Fabiani, et al., Speckle-Tracking Imaging, Principles and Clinical Applications: A Review for Clinical Cardiologists); http://dx.doi.org/10.5772/64261.

Pavlatos, et al., Three-Dimensional Strains in Human Posterior Sclera Using Ultrasound Speckle Tracking; Journal of Biomedical Engineering; Feb. 2016, vol. 138; DOI: 10.1115/1.4032124.

Pavlatos, Elias, et al. "Imaging corneal biomechanical responses to ocular pulse using high-frequency ultrasound." IEEE transactions on medical imaging 37.2 (2017): 663-670.

\* cited by examiner

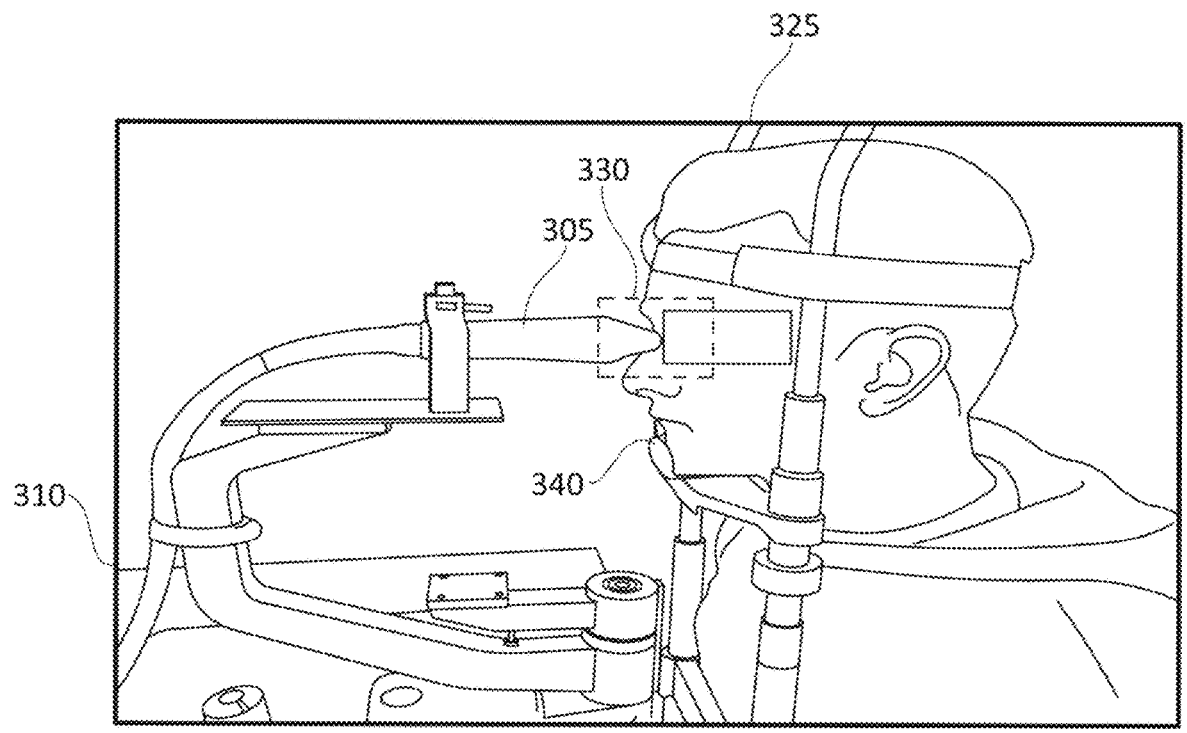
FIG. 3A PRIOR ART
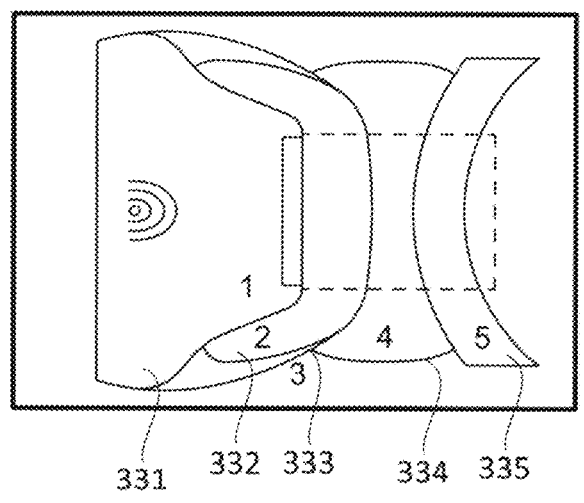 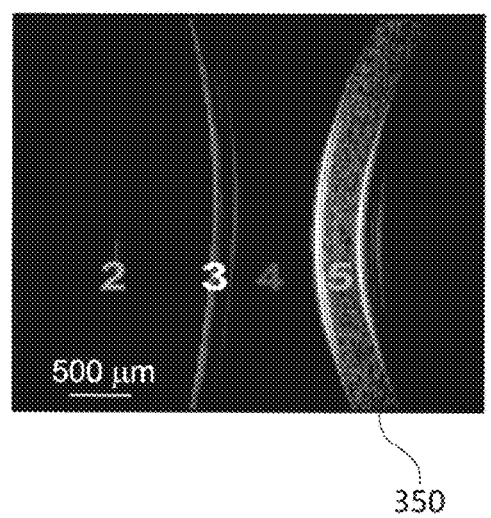
FIG. 3B
PRIOR ART
FIG. 3C
PRIOR ART

APPARATUS AND METHODS FOR QUANTIFYING THE BIOMECHANICAL ATTRIBUTES OF THE CORNEA AND THE ANTERIOR SCLERA

CROSS REFERENCE TO RELATED APPLICATIONS

This application claims priority to and incorporates entirely by reference U.S. Provisional Patent Application Ser. No. 63/504,200 filed on May 24, 2023 and entitled Apparatus and Methods for Quantifying the Biomechanical Attributes of the Cornea and the Anterior Sclera.

This application also claims priority to and incorporates entirely by reference U.S. Provisional Patent Application Ser. No. 63/569,501 filed on Mar. 25, 2024 and entitled Apparatus and Methods for Quantifying the Biomechanical Attributes of the Cornea and the Anterior Sclera.

STATEMENT REGARDING FEDERALLY SPONSORED RESEARCH

This invention was made with government support under R01-EY025358 awarded by the National Institutes of Health. The government has certain rights in the invention.

BACKGROUND

Ultrasound imaging has been used in numerous fields to acquire data about the human body for diagnostic purposes. Most individuals consider ultrasound imaging to involve pregnancy check-ups or possibly vascular or cardiological images. Ultrasound imaging and related technology, however, also play a role in ophthalmology and images to diagnose, prevent, and/or treat eye conditions. A need in the field of ophthalmology exists to take advantage of historical research in ultrasound imaging and use modern advances in the field for eye patients.

BRIEF SUMMARY OF THE DISCLOSURE

In an embodiment of this disclosure, a computer implemented method of quantifying stiffness in eye tissue includes using a computerized ultrasound imaging system to perform steps, including acquire a plurality of ultrasound images of the eye tissue; acquire radiofrequency data of the ultrasound images of the eye at multiple intraocular pressures; apply ultrasound speckle tracking to the radiofrequency data; identify tissue displacements corresponding to a change in intraocular pressure; quantify eye tissue strain; and prepare a stiffness map of the eye tissue.

In another embodiment, the eye tissue is a cornea.

In another embodiment, the eye tissue is an anterior portion of the sclera.

In another embodiment, the stiffness map includes values of strains normalized to intraocular pressure changes at positions within the tissue.

In another embodiment, the stiffness map includes values of strains normalized to ocular pulse pressure.

In another embodiment, the stiffness map includes values of Young's modulus of the eye tissue at positions within the tissue.

In another embodiment, the stiffness map is analyzed to identify a weakest region of the tissue.

In another embodiment, the stiffness of the weakest region of the tissue is correlated with eye disease severity.

A different embodiment of this disclosure includes a computer implemented method of quantifying corneal axis strain in an eye by using a computerized ultrasound imaging system to perform the following steps: acquire a plurality of ultrasound images of the eye; acquire radiofrequency data of the ultrasound images of the eye at multiple intraocular pressures; apply ultrasound speckle tracking to the radiofrequency data; identify tissue displacements corresponding to a change in intraocular pressure within the eye; quantify eye tissue strain from the tissue displacements; and prepare a corneal axis strain plot of a cornea within the eye.

In another embodiment, the corneal axis strain plot comprises values of strains normalized to intraocular pressure changes at positions within the tissue.

In another embodiment, the corneal axis strain plot includes values of strains normalized to ocular pulse pressure.

In another embodiment, the corneal axis strain plot is analyzed to identify a weakest region of the tissue.

In another embodiment, the stiffness of the weakest region of the tissue is correlated with eye disease severity.

In yet another embodiment, a computer implemented method of quantifying eye disease severity in an eye includes using a computerized ultrasound imaging system to perform the following steps: acquire a plurality of ultrasound images of the eye; acquire radiofrequency data of the ultrasound images of the eye at multiple intraocular pressures; apply ultrasound speckle tracking to the radiofrequency data; identify tissue displacements corresponding to a change in intraocular pressure within the eye; quantify eye tissue strain from the tissue displacements; and prepare a corneal axis strain plot of a cornea within the eye; and repare a thickness map and a curvature map for the cornea; identifying a weakest area of the eye tissue; and grade a level of eye diseases for the weakest area of the eye tissue.

In another embodiment, the method includes preparing a stiffness map of the eye tissue before grading the level of eye disease.

DESCRIPTION OF THE FIGURES

FIG. 3A is a PRIOR art schematic of several components of an ultrasound experimental setup (Ref. 1 below), showing a patient positioned for in vivo ocular pulse elastography examination as disclosed herein.

FIG. 3B is a PRIOR art schematic of several components of an ultrasound experimental setup (Ref. 1 below), showing a close up of the probe tip and the cornea during ultrasound scanning, including 1. Ultrasound probe, 2. Alginate gel, 3. Clear probe cover, 4. Gel for ultrasound transmission, 5, cornea under examination.

FIG. 3C is a PRIOR art schematic of several components of an ultrasound experimental setup (Ref. 1 below) and illustrates an ultrasound B-mode image of FIG. 3B.

FIG. 5A is a PRIOR art schematic of low acoustic scattering regions in ultrasound B-mode images (Ref. 2 below) and showing co-localized regions (white arrows).

FIG. 5B is a PRIOR art schematic of low acoustic scattering regions in ultrasound B-mode images (Ref. 2 below) and showing increased first principal strains (black arrow heads).

FIG. 5C is a PRIOR art schematic of low acoustic scattering regions in ultrasound B-mode images (Ref. 2 below) and shows the histology of the eye with arterial circle of Zinn-Haller (white arrows).

FIG. 6 is a flow chart of a method of this disclosure using ultrasound imaging principles to quantify stiffness of tissues in a patient's eye according to some implementations of this disclosure.

DETAILED DESCRIPTION

Figure 1:
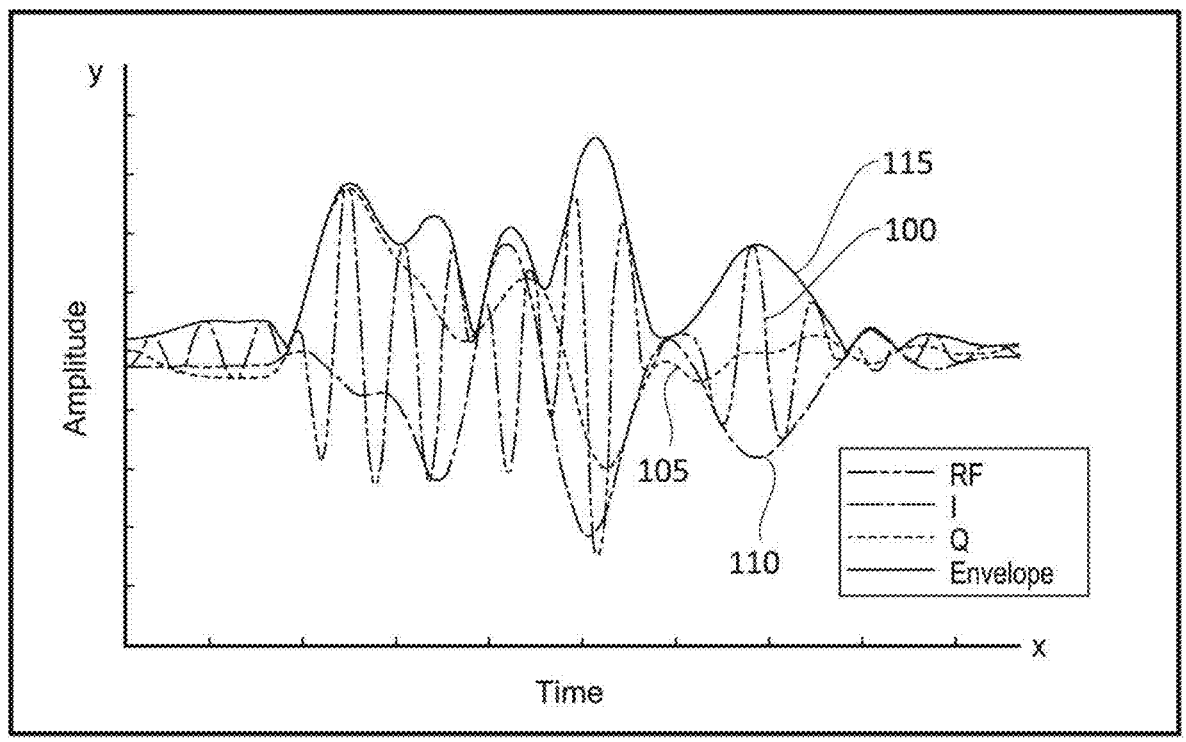
FIG. 1 is a PRIOR ART schematic (Ref. 3 below) of electrical voltage signals from a transducer that received reflected ultrasound waves back from a subject being imaged with an ultrasound transmission probe as set forth in this disclosure.
Figure 2:
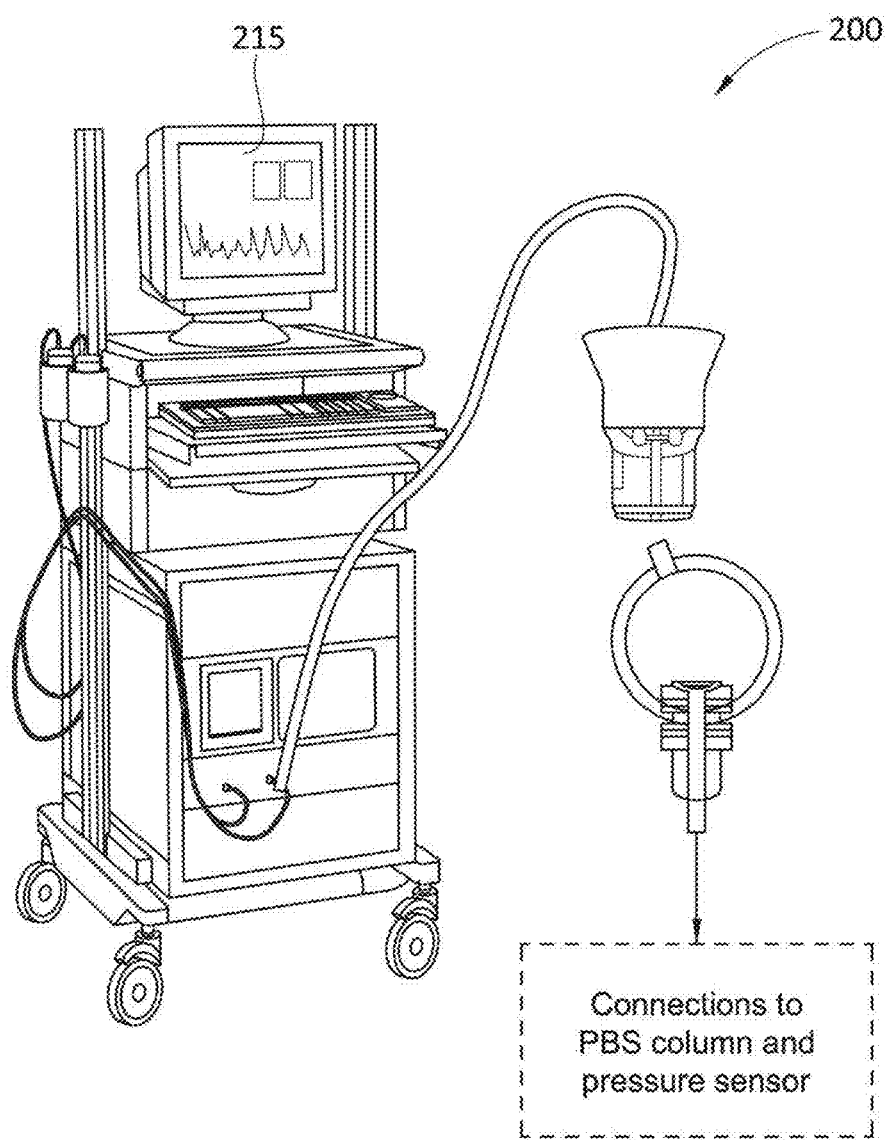
FIG. 2 is a PRIOR ART perspective view of an ultrasound experimental setup (Ref. 7 below) using a commercially available high frequency ultrasound transducer system as set forth in this disclosure. The experimental setup was used for human donor scleral shell measured with the Vevo 660 high-frequency ultrasound system for testing an optic nerve head. The shell was clamped near the corneo-scleral junction away from the measured posterior sclera and immersed in phosphate buffered saline (PBS). The ultrasound probe was not in touch with the tissue during scanning.
Figure 4A:
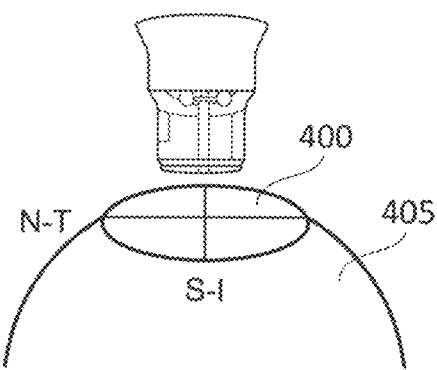
FIG. 4A is a PRIOR art schematic (Ref. 2 below) showing ultrasound scanning orientations for an ultrasound probe positioned next to an eye.
Figure 4B:
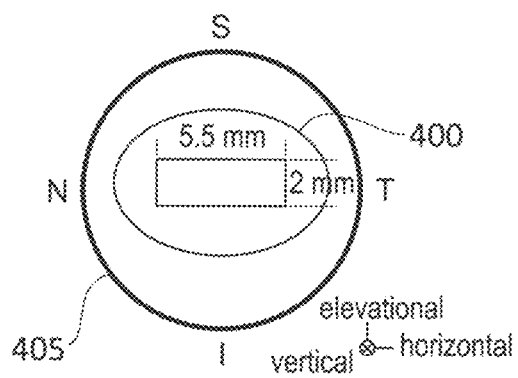
FIG. 4B is a PRIOR art schematic (Ref. 2 below) showing three dimensional scanning regions used according to implementations discussed herein.

In non-limiting embodiments, this disclosure aims to measure mechanical strains induced by the ocular pulse and to map the strains' spatial distributions in keratoconus patients to evaluate how they differ from those in patients with normal corneas. An ultrasound transducer, or probe 200, 305, 805, such as those set forth in FIGS. 2-4 and FIG. 8 as examples, emits sound waves toward an area 330 to be imaged and receives back certain back-scattered sound waves that are converted to electrical voltage signals within electronics of the transducer. Reference 3 below illustrated through FIG. 1 that the converted electrical voltage signals can be plotted according to time (x axis) and amplitude (y axis) with four different components, including a radio frequency (RF) signal 100, an in phase signal (I) 110, a quadrature signal (Q) 105, and an envelope signal 115. The I/Q signals are gathered via quadrature sampling that is processed to display ultrasound images on a computer display, shown, for example in FIG. 2 as Ref. 215. The RF portion of the signal may be considered the "speckles" on an ultrasound image that are important for this discussion. The envelope signals are often called RAW signals that correlate to the ultrasound image seen on a display 215.

Figure 9A:
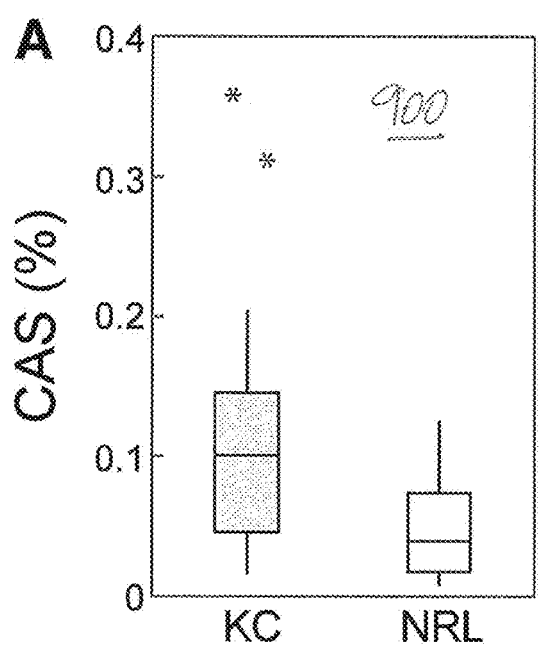
FIG. 9A is a schematic plot of corneal axial strain (CAS) for an eye with keratoconus and a normal eye according to tests conducted pursuant to this disclosure.
Figure 9B:
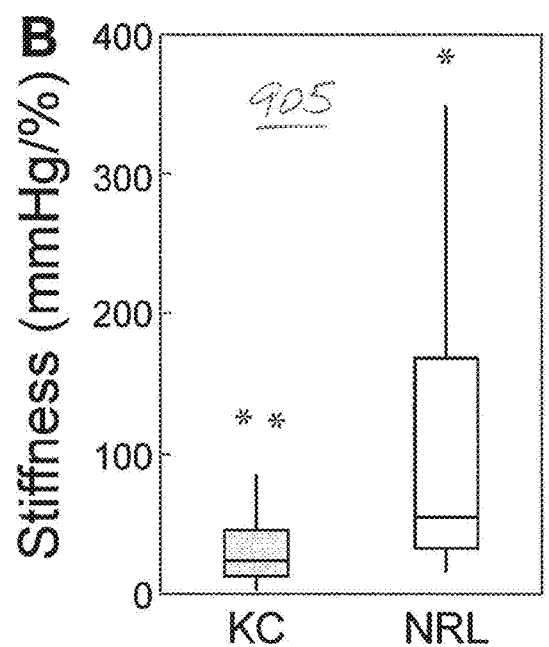
FIG. 9B is a schematic plot of corneal stiffness for an eye with keratoconus and a normal eye according to tests conducted pursuant to this disclosure.

As explained in Reference 5 below and shown in another example 500 of FIG. 5A, the gray speckles in B-mode ultrasound images are the result of interference of ultrasound backscatter from structures that are smaller than the ultrasound wavelength. Reference 6 describes "speckles" as small groups of pixels in the image illustrating the spatial distribution of gray values in the image. Blocks of these speckles, known as kernels, can be tracked from frame to frame and show how tissue is moving during the imaging process. As explained in Reference 1 below, a patient's heartbeat can cause movement of eye tissue via an "ocular pulse," that affects portions of the eye, including but not limited to the cornea and the sclera, during an ultrasound imaging session. By tracking that heartbeat induced movement of the eye tissue, various stiffness measurements shown in FIGS. 9A and 9B, as well as FIGS. 11-15 of the tissue can be evaluated for diagnostic purposes. By using the above-described speckle tracking within ultrasound imaging of ophthalmic tissues, one can discern corneal axial displacement 900, 1100, 1200, 1300, and 1400 and strain values that are useful to quantify tissue stiffness 905. See Reference 1. Two-dimensional and three-dimensional speckle tracking can be used to track speckle movement from frame to frame and evaluate strain within the imaged tissue, even strain that is outside the plane of any one slice of the image. Reference 4. Eye tissue movement during a heartbeat, (i.e., fluctuations of intraocular pressure above its diastolic level (Reference 1) called an ocular pulse) can be tracked by defining clusters of speckles and following their movement from frame to frame. As explained in Reference 4 and shown in FIGS. 4A and 4B, corneal tissue 400 or scleral tissue 405 have velocity that can be estimated from the shift of the individual speckles divided by the time between the frames. Speckle tracking provides for identifying in-plane components of the velocity vectors calculated between frames of ultrasound image data. Reference 6. Strain rate can be determined afterwards as the deformation ratio as a change in the tissue position from its original position.

Reference 2 gives an illustration of calculating strain of the cornea exposed to pressure deformation. In Reference 2, consecutive 2D B-mode images are acquired and stacked to form a 3D volume that can be subject to speckle tracking in multiple directions. As described in Reference 2, a grid of overlapping kernels were defined within the 3D volume, and the new location of every kernel at each pressure change pulse was tracked. Tissue displacement was calculated as vectors between the kernel locations at successive steps. The displacement can be used to calculate speckle velocity and therefore strain of the tissue. The strain values can be mapped to show stiffness 905 at particular positions within the tissue. The strain values may include shear strain. The stiffness, therefore, may correspond to Young's modulus values of the eye tissue at respective positions or may correspond to shear wave velocity of the tissue during displacement.

The Young's modulus (E) is a property of the material that tells how easily it can stretch and deform and is defined as the ratio of tensile stress (σ) to tensile strain (E). Where stress is the amount of force applied per unit area (σ=F/A) and strain is extension per unit length (ε=dl/l).

This disclosure incorporates by reference, as if fully set forth herein, the article cited as Kwok S, Pan X, LiuW, Hendershot A, Liu J (2022) High-frequency ultrasound detects biomechanical weakening in keratoconus with lower stiffness at higher grade. PLOS ONE 17(7):e0271749. https://doi.org/10.1371/journal.pone.0271749. The entire article explains a standard protocol for using ultrasound to test eye health. This article explains that keratoconus 1010, 1020 is one non-limiting type of a progressively degenerative corneal disease causing a patient's cornea to thin out and protrude into a conical shape that is different from a normal cornea 1005. This eye condition has been hard to diagnose properly due to the length of time for the symptoms to meet a standard to definitively show keratoconus. Kwok et al. explain that the biomechanical properties of a patient's cornea can be a disease marker for keratoconus, and efforts to track these biomechanical properties are valuable tools for diagnosing keratoconus and other conditions. Kwok et al. describe their process at page 3 of 16 of the article.

Figure 8:
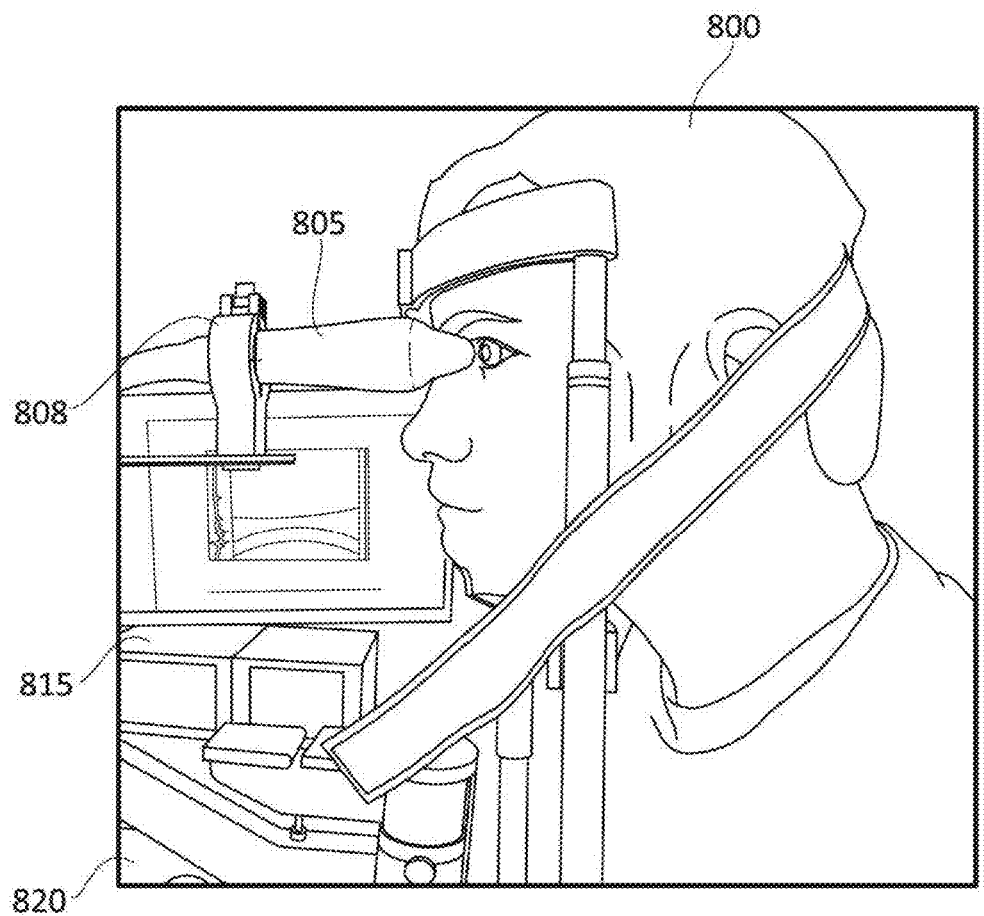
FIG. 8 shows an example test setup for in vivo ocular pulse elastography using high frequency ultrasound according to embodiments of this disclosure.

A patient sits as shown in FIG. 8 with their head 810 placed on a head-and-chin rest 815 mounted on an anti-vibration table 820. A high-frequency ultrasound probe 805 is secured to a probe-holder 808 mounted on the table. The probe surface may typically include a cellular membrane and then a layer of eye lubricating gel. In example embodiments, the patient's eyes are anesthetized with eye drops before the test proceeds. For each measurement, ultrasound images are gathered by a computer from the ultrasound probe after the probe has advanced towards the eye. In non-limiting examples, the preferred images are gathered when the gel on the probe surface established contact with the cornea. Sound waves were transmitted through the gel layer into the cornea.

As an example of a test set up, FIG. 3A is one example schematic of several components of an ultrasound experimental setup (Ref. 1 below), showing a patient positioned for in vivo ocular pulse elastography examination as disclosed herein. A region 330 of the patient's eyes 325 has been identified for testing. An anti-vibration table 310 holds the ultrasound probe 305 in a chin and head rest 340. FIG. 3B shows several components of an ultrasound experimental setup (Ref. 1 below), showing a close up of the probe tip 331 and the cornea 335 during ultrasound scanning, including 1. Ultrasound probe 331, 2. Alginate gel 332, 3. Clear probe cover 333, 4. Gel 334 for ultrasound transmission, and 5, cornea 335 under examination. FIG. 3C illustrates a schematic of several components of an ultrasound experimental setup (Ref. 1 below) and illustrates an ultrasound B-mode image 350 of FIG. 3B with the speckles of gray dots therein.

In one non-limiting example described by Kwok et al. in Reference 9, one thousand consecutive B-mode frames and radiofrequency (RF) data are gathered for the central 5.7 mm of the cornea. The images may be acquired at 128 frames per second along the nasal-temporal axis. In normal eyes, all ultrasound scans were centered at the apex. For KC eyes, the ultrasound scans were also centered at the apex, except in corneas whose thinnest point was outside the pupil margin. For these corneas, two measurements were acquired at the apex and two more were collected at the cone region. Four repeated measurements were obtained in each eye, with additional gel applied to the probe surface as needed. The right eye (OD) was measured first, followed by the left eye (OS) in all subjects Kwok's Reference 9 proceeds to explain that a region of interest is determined according to a patient's anatomy and kernels (e.g., three dimensional sets of pixels) are defined for tracking in subsequent images. This allows the system "to compute the displacement at each grid point." In non-limiting embodiments, a unique speckle pattern within the kernel may be centered at the initial grid point and can be tracked in subsequent frames using statistical cross-correlation. The maximum correlation coefficient value indicated the best match, and the corresponding kernel center was designated as the new location of the displaced grid point. Spline interpolation was used for subpixel tracking.

In non-limiting embodiments, the speckle tracking methods may be similar to those explained and validated in Reference 10 (Tang J, Liu J (September 2012) Ultrasonic Measurement of Scleral Cross-Sectional Strains During Elevations of Intraocular Pressure: Method Validation and Initial Results in Posterior Porcine Sclera. Journal of Biomechanical Engineering, September 2012, Vol. 134, pp. 091007-1 to 091007-10), Section 2.2. This article is incorporated by reference as if set forth fully herein. Reference 10 shows how a correlation based speckle tracking system operates in ultrasound elastography. While tracking the above described kernels defined in the ultrasound images, a correlation coefficient can be calculated according to proven mathematics described in the article. The data with the highest correlation coefficient magnitude is used to identify a displacement vector of particular pixels or voxels of an ultrasound image and track the displacement across a set of images.

Figure 12:
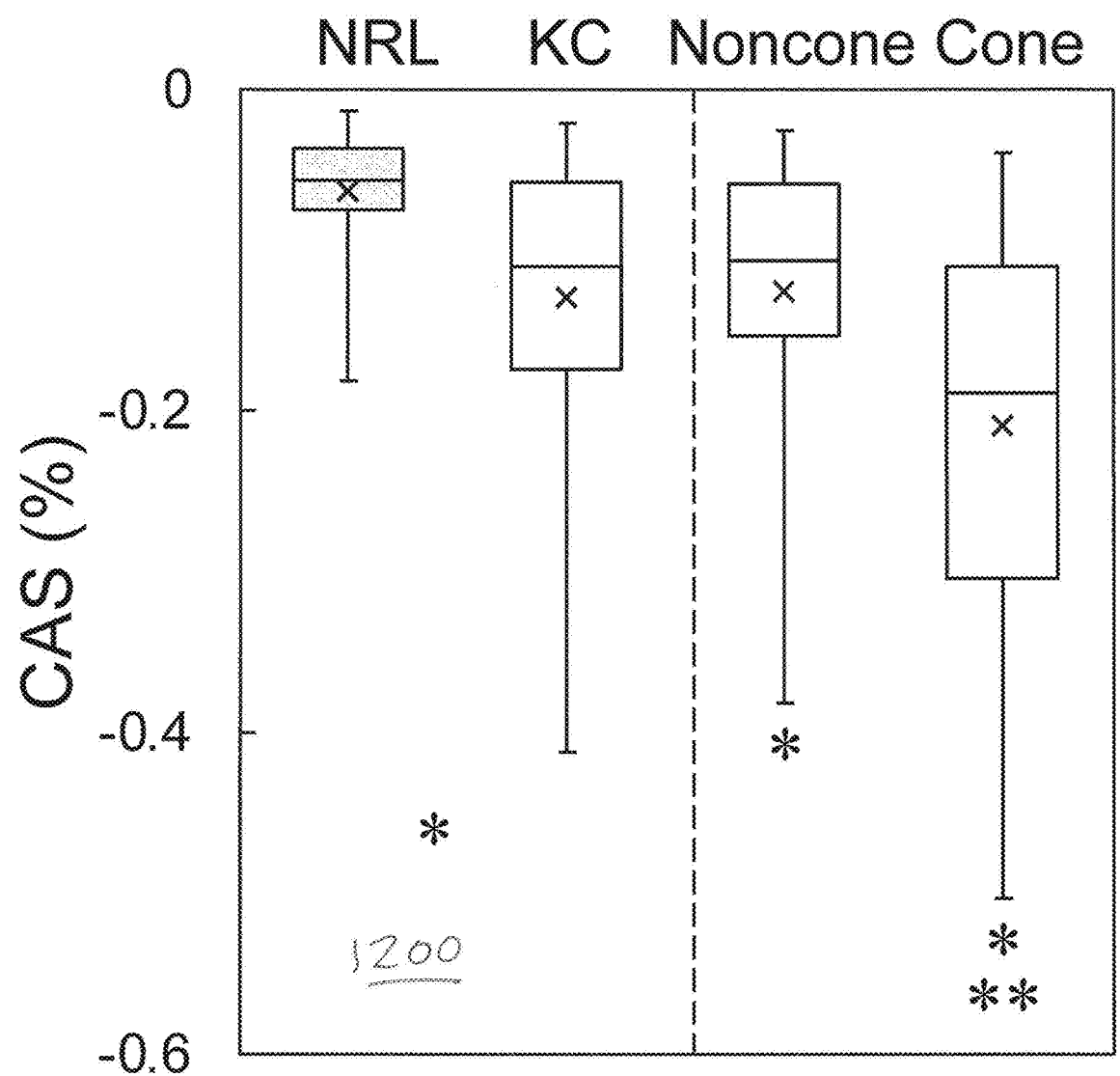
FIG. 12 is a schematic plot of both the cone and non-cone region keratoconus had larger strains than normal cornea where x denotes average, * denotes $p<0.05$ compared to normal, and ** denotes $p<0.05$ compared to non-cone region.
Figure 13:
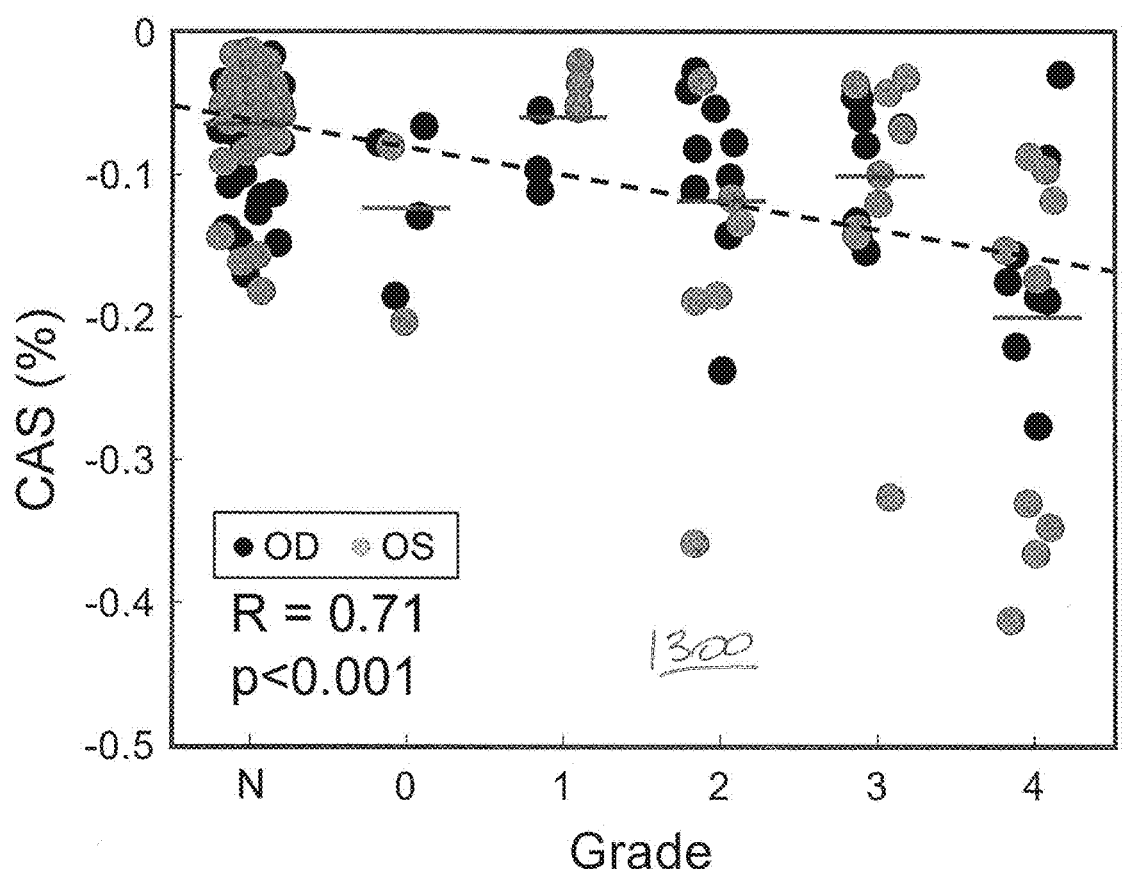
FIG. 13 is a schematic plot of corneal axial strain (CAS) magnitude and illustrates that CAS increased significantly with $p<0.001$. The horizontal lines mark the average value within each grade.
Figure 14:
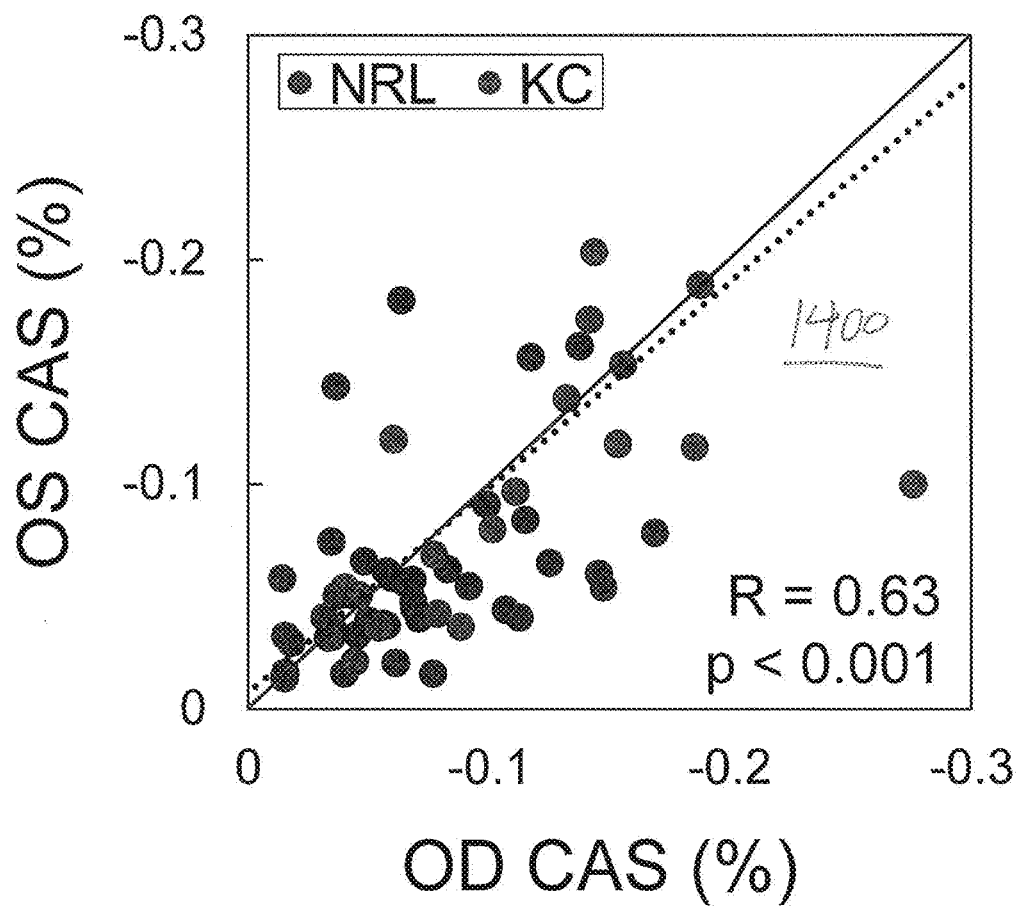
FIG. 14 is a schematic plot of corneal axial strain (CAS) and shows bilateral association in both normal ($R=0.38$, $p=0.016$) and keratoconus (KC) ($R=0.61$, $p=0.002$) eyes.

With the Kwok and Tang articles as a backdrop, this disclosure developed a high-resolution ultrasound elastography method to measure corneal deformation induced by the ocular pulse. The study of this disclosure compared corneal axial strains (CAS) 505, 506, 900, 1100, 1200, 1300, 1400 as shown in FIGS. 5, 9, and 11-14 in keratoconus (KC) patients and normal controls. The study also qualitatively evaluated the spatial mapping of CAS in some KC corneas. These tools allow for earlier detection and diagnosis of eye diseases such as keratoconus (KC). FIG. 14 allows for grading severity of disease for keratoconus based on graphical illustrations of the corneal axial strains 1400.

In an embodiment of this disclosure shown in FIG. 6, a computer implemented method 699 of quantifying stiffness in eye tissue includes using a computerized ultrasound imaging system (FIG. 8) to perform steps, including acquire a plurality of ultrasound images of the eye tissue 600; acquire radiofrequency data of the ultrasound images of the eye at multiple intraocular pressures 605; apply ultrasound speckle tracking 610 to the radiofrequency data; identify tissue displacements 615 corresponding to a change in intraocular pressure; quantify eye tissue strain 620; and prepare a stiffness map 625 of the eye tissue.

Example Embodiment 1

Figure 10:
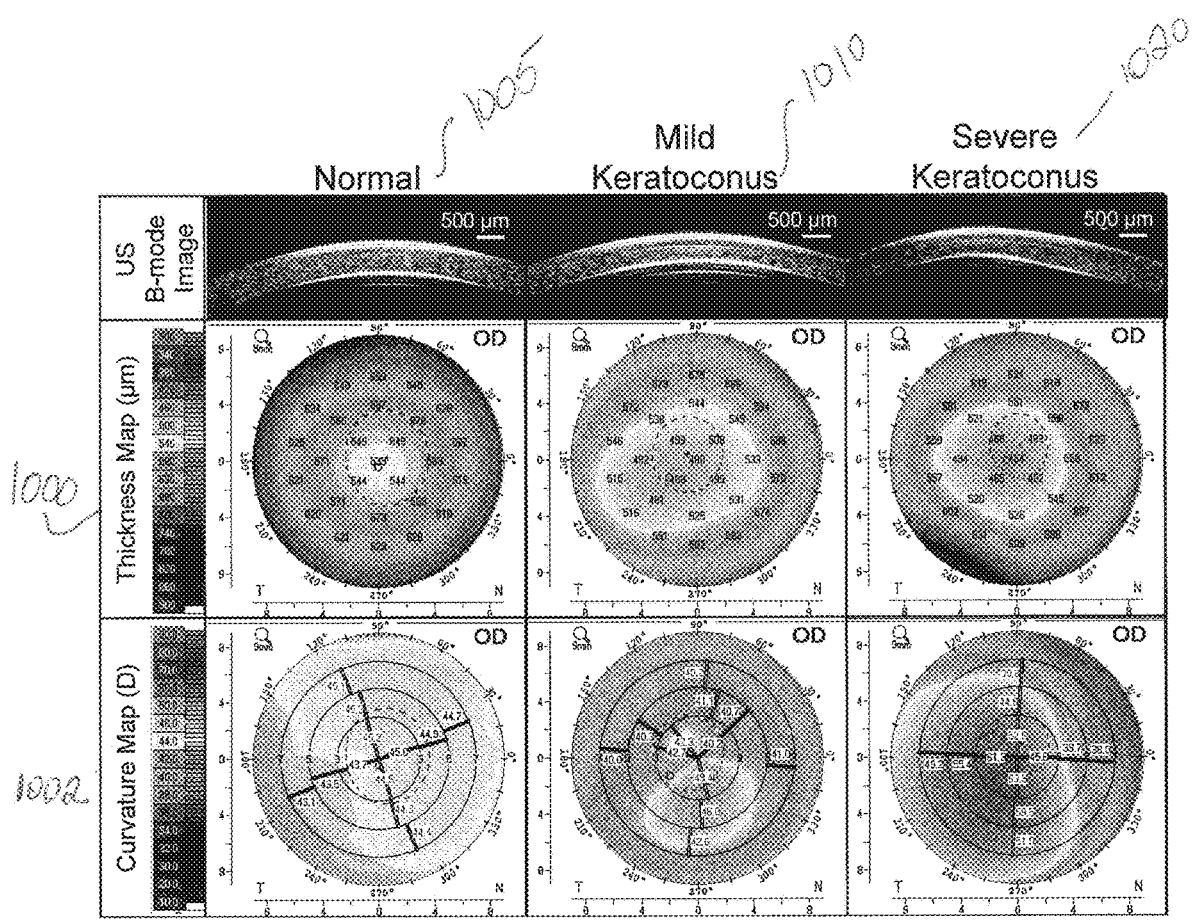
FIG. 10 is a schematic plot of high frequency ultrasound B-mode images of a central 5.7 mm section of a cornea from a normal subject (left), a Grade-2 keratoconus (middle) and a Grade-4 keratoconus (right), along with corresponding thickness and curvature maps according to tests conducted pursuant to this disclosure.

In non-limiting implementations, a high-frequency ultrasound imaging system (Vevo2100, FujiFilm VisualSonics, Toronto) may be used to record a video of the patient's cornea 400 or anterior sclera 405. The patient is asked to hold their eyes stable, while the system acquires 1000 frame images at a frame rate of 128 frames per second. The radio frequency (RF) data 100 of the ultrasound signals are saved for analysis. This example may apply an ultrasound speckle tracking algorithm to calculate the displacements of the tissue between each scanned frame. The displacements are accumulated over time, showing cyclic rhythms corresponding to the heartbeat, or ocular pulse of a patient. This displacement data is further analyzed to obtain the compressive strains through tissue thickness 1000 as shown in FIG. 10, which gives a quantification of tissue stiffness. The strains can be further normalized by the ocular pulse amplitude, measured with clinical equipment. An overall stiffness measure and a stiffness map 905 of FIG. 9B will be obtained. These measures will be used to diagnose keratoconus in young patients (teenagers) at an early stage, as an abnormally low stiffness or heterogeneity in stiffness will indicate high risk for progression. Intervention can be delivered to those young patients to arrest vision-threatening progression. The stiffness measure can also be used to monitor cross-linking treatment, which aims to increase stiffness, and by quantifying the stiffness change before and after treatment. The stiffness measure of both the cornea and the anterior sclera can be used for diagnosis and treatment monitoring.

Example Embodiment 2

Twenty normal controls (40 eyes) and 20 KC patients (35 eyes) were recruited. Each subject underwent three tests: (1) OCULUS Pentacam for corneal topography; (2) PASCAL Dynamic Contour Tonometry for intraocular pressure (IOP) and ocular pulse amplitude (OPA), and (3) ocular pulse elastography (OPE) for corneal displacements and strains using the Vevo2100 ultrasound system. Corneal topography data was reviewed by a specialist (AH) to determine the presence and grade of keratoconus (KC). Each eye underwent 4 ultrasound measurements, each acquiring 1000 frames in 8 secs of the cornea during fixation. This data was processed to obtain corneal displacements and CAS following published protocols discussed above in regard to Reference 9 [Kwok et al, PLOS ONE 17(7):e0271749]. Corneal stiffness was calculated as OPA/CAS for each eye. Linear mixed models for repeated measures were used to account for association between two eyes of the same subject in data analysis.

Results: Mean CAS magnitude (in %) was significantly higher (p=0.032, FIG. 9A) in KC (0.169, 95% CI: 0.061, 0.278) than normal (0.050, 95% CI: 0.038, 0.061). Mean corneal stiffness (unit: mmHg/%) was significantly lower (p=0.001, FIG. 9B) in KC (33.7, 95% CI: 22.1, 44.3) than normal (115.1, 95% CI: 70.8, 159.3). Age, IOP, and OPA were not statistically different between groups. High strains were observed in the cone region of KC corneas of different grade (FIG. 10).

Conclusions: KC corneas deformed more (i.e., larger CAS) than normal corneas in response to the ocular pulse, confirming biomechanical weakening in KC. High strains appeared to concentrate in the cone region, indicating that the cone may have the greatest mechanical weakening. Ultrasound elastography may provide both quantitative and spatially resolved biomechanical evaluation of the cornea to aid in KC diagnosis.

Figure 11A:
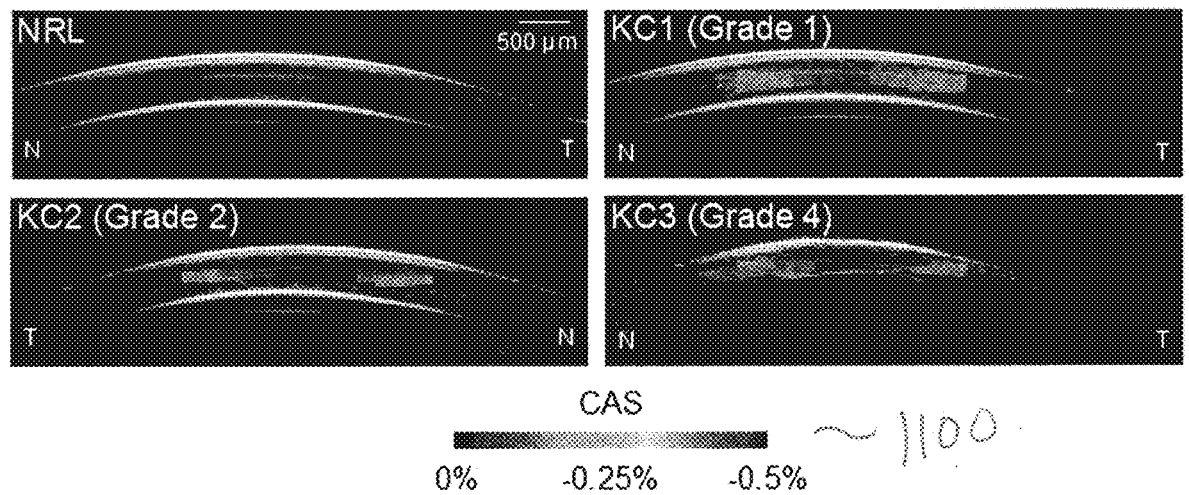
FIG. 11A is a representative corneal axial strain (CAS) spatial maps for one normal (top left) and three keratoconus corneas showing higher magnitude and larger spatial variability of compressive strains in keratoconus corneas.
Figure 11B:
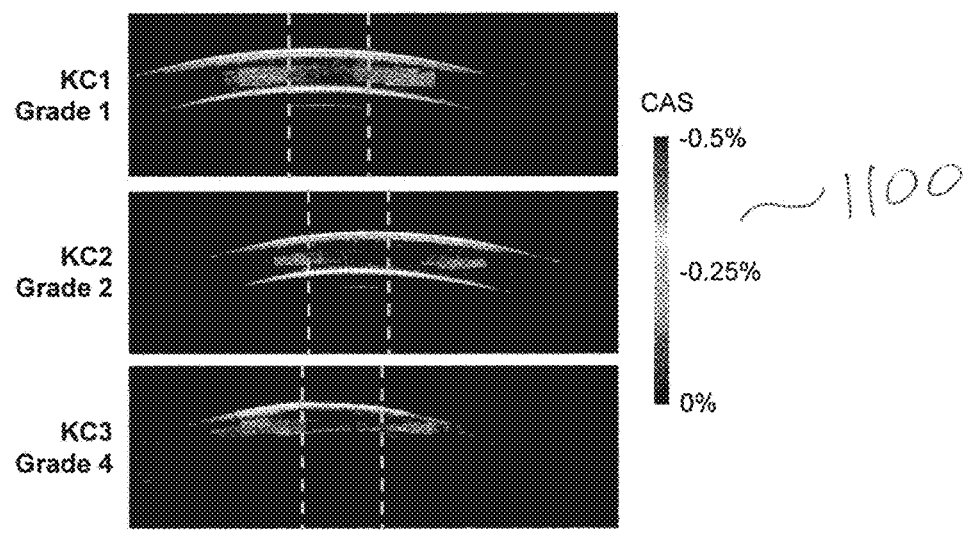
FIG. 11B is another view of the representative corneal axial strain (CAS) spatial maps for the three keratoconus corneas of FIG. 11A. The cone region (area between two dashed lines) had higher strains (dark red in CAS map overlaid on ultrasound image) in three KC corneas.

As shown in FIG. 11, KC corneas deformed more (i.e., larger CAS) than normal corneas in response to the ocular pulse, more so in higher grade of disease, confirming progressive biomechanical weakening in KC. As illustrated in FIGS. 12-14, high strains appeared to concentrate in the cone region, indicating that the cone may have the greatest mechanical weakening. Non-cone region in KC corneas also had larger strains compared to normal corneas, indicating overall weakening. Ultrasound elastography may provide both quantitative and spatially resolved biomechanical evaluation of the cornea to aid in keratoconus diagnosis.

Additional Embodiments

In an embodiment of this disclosure shown in FIG. 6 as Ref. 699, a computer implemented method of quantifying stiffness in eye tissue includes using a computerized ultrasound imaging system to perform steps, including acquire a plurality of ultrasound images of the eye tissue; acquire radiofrequency data of the ultrasound images of the eye at multiple intraocular pressures; apply ultrasound speckle tracking to the radiofrequency data; identify tissue displacements corresponding to a change in intraocular pressure; quantify eye tissue strain; and prepare a stiffness map of the eye tissue.

In another embodiment, the eye tissue is a cornea 400.

In another embodiment, the eye tissue is an anterior portion of the sclera 405.

In another embodiment, the stiffness map 905 includes values of strains normalized to intraocular pressure changes at positions within the tissue.

In another embodiment, the stiffness map 905 includes values of strains normalized to ocular pulse pressure.

In another embodiment, the stiffness map 905 includes values of Young's modulus of the eye tissue at positions within the tissue.

In another embodiment, the stiffness map 905 is analyzed to identify a weakest region of the tissue.

In another embodiment, the stiffness 905 of the weakest region of the tissue is correlated with eye disease severity. In FIG. 14, the corneal axis strain for the right eye (OD on the x-axis) and left eye (OS on the y-axis) are shown as respective percentages. FIG. 13 plots these values at 1300 to show how to determine a severity, or grade, of any eye disease, such as but not limited to keratoconus. In FIG. 13, the healthier eyes have lower strain values across the anatomy of both eyes, where the more severe disease on the right side of the x-axis had scattered values of high strain at different physical locations, meaning that the eye was weaker and less healthy in those locations, meriting a higher grade on the x-axis.

A different embodiment of this disclosure includes a computer implemented method of quantifying corneal axis strain in an eye by using a computerized ultrasound imaging system to perform the following steps: acquire a plurality of ultrasound images of the eye; acquire radiofrequency data of the ultrasound images of the eye at multiple intraocular pressures; apply ultrasound speckle tracking to the radiofrequency data; identify tissue displacements corresponding to a change in intraocular pressure within the eye; quantify eye tissue strain from the tissue displacements; and prepare a corneal axis strain (CAS) plot 900, 1100, 1200, 1300, 1400 of a cornea within the eye.

In another embodiment, the corneal axis strain plot comprises values of strains normalized to intraocular pressure changes at positions within the tissue.

In another embodiment, the corneal axis strain plot includes values of strains normalized to ocular pulse pressure.

In another embodiment, the corneal axis strain plot is analyzed to identify a weakest region of the tissue.

In another embodiment, the stiffness of the weakest region of the tissue is correlated with eye disease severity.

In yet another embodiment, a computer implemented method of quantifying eye disease severity in an eye includes using a computerized ultrasound imaging system to perform the following steps: acquire a plurality of ultrasound images of the eye; acquire radiofrequency data of the ultrasound images of the eye at multiple intraocular pressures; apply ultrasound speckle tracking to the radiofrequency data; identify tissue displacements corresponding to a change in intraocular pressure within the eye; quantify eye tissue strain from the tissue displacements; and prepare a corneal axis strain plot of a cornea within the eye; and prepare a thickness map 1000 and a curvature map 1005 for the cornea as shown in FIG. 10; identifying a weakest area of the eye tissue; and grade a level of eye diseases for the weakest area of the eye tissue.

In another embodiment, the method includes preparing a stiffness map of the eye tissue before grading the level of eye disease as shown in FIG. 13.

Figure 7:
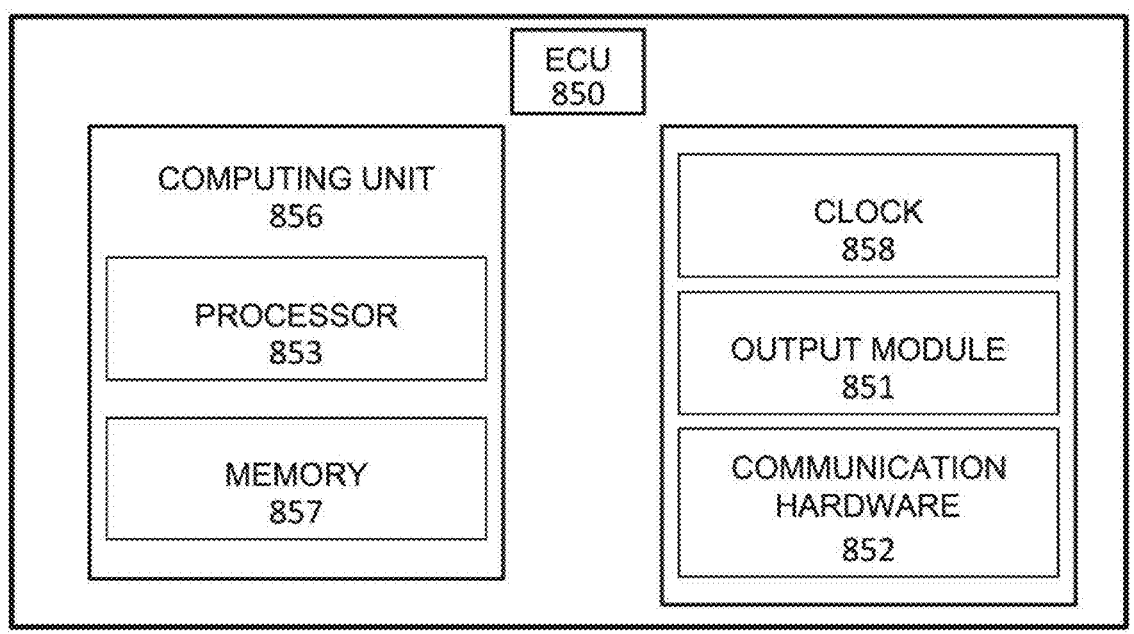
FIG. 7 is a schematic view of an electronic control unit including a computer, processor, and memory that may be used with an ultrasound imaging system to implement the methods and apparatuses of this disclosure.

Implementations described above and in relation to FIGS. 1-6 and 8-14 may be used with equipment that implements computerized methods that are activated with an electronic control unit ("ECU") 850, represented by FIG. 7. The electronic control unit may be programmed to control the above described solenoid and FET embodiments with solid state electronics. In particular, the described equipment, communicate with a computer processor 853 configured to process one or more characteristics and/or profiles of the electrical signals received. The ECU 850 may include a computing unit 856, a system clock 858, an output module 851 and communication hardware 852. In its most basic form, the computing unit may include a processor and a system memory. The processor may be a standard programmable processor that performs arithmetic and logic operations necessary for operation of the circuit breaker system. The processor may be configured to execute program code encoded in tangible, computer-readable media. For example, the processor may execute program code stored in the system memory 857, which may be volatile or non-volatile memory. The system memory is only one example of tangible, computer-readable media. In one aspect, the computing unit can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 853, the machine becomes an apparatus for practicing the disclosed subject matter.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to example embodiments, however persons skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability.

Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

In example implementations, at least some portions of the activities may be implemented in software provisioned on a networking device, such as software controlling solenoids and transistors used in the circuit breaker embodiments. In some embodiments, one or more of these features may be implemented in computer hardware, provided external to these elements, or consolidated in any appropriate manner to achieve the intended functionality.

Furthermore, computer systems described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

REFERENCES

The following publications are referred to herein and incorporated by reference into this disclosure.
1. Kwok, et al., Heartbeat-Induced Corneal Axial Displacement and Strain Measured by High Frequency Ultrasound Elastography in Human Volunteers, Trans Vis Sci Tech. 2020; 9 (13): 33
2. Clayson, et al., 3D Characterization of Corneal Deformation Using Ultrasound Speckle Tracking, J. Innov. Opt. Health Sci. 2017 November; 10 (6); doi: 10.1142/S1793545817420056.
3. Telemed Inc., Telemed Ultrasound for Science and Research; RF Data Access Brochure; April 2020.
4. Blessberger and Binder; Two Dimensional Speckle Tracking Echocardiography: Basic Principles, Heart, 2010; 96:716-722; doi 10.1136/hrt.2007.141002.
5. Mor-Avi et al., Current and Evolving Echocardiographic Techniques for the Quantitative Evaluation of Cardiac Mechanics: ASE/EAE Consensus Statement on Methodology and Indications Endorsed by the Japanese Society of Echocardiography; European Journal of Echocardiography; 2011, 12, 167-205; doi: 10.1093/ejechocard/jer021.
6. Lakshmanadoss, Umashankar, editor. Echocardiography in Heart Failure and Cardiac Electrophysiology. InTech, 2016 Crossref, doi: 10.5772/61427; Oct. 19, 2016 (Chapter 5 by Fabiani, et al., Speckle-Tracking Imaging, Principles and Clinical Applications: A Review for Clinical Cardiologists); http://dx.doi.org/10.5772/64261.
7. Pavlatos, et al., Three-Dimensional Strains in Human Posterior Sclera Using Ultrasound Speckle Tracking; Journal of Biomedical Engineering; February 2016, Vol. 138; DOI: 10.1115/1.4032124
8. Pavlatos et al, IEEE Med Imaging, 2018, 37 (2): 663-670
9. Kwok S, Pan X, LiuW, Hendershot A, Liu J (2022) High-frequency ultrasound detects biomechanical weakening in keratoconus with lower stiffness at higher grade. PLOS ONE 17 (7): e0271749. https://doi.org/10.1371/journal.pone.0271749.
10. Tang J. Liu J (September 2012) Ultrasonic Measurement of Scleral Cross-Sectional Strains During Elevations of Intraocular Pressure: Method Validation and Initial Results in Posterior Porcine Sclera. Journal of Biomechanical Engineering. September 2012. Vol. 134, pp. 091007-1 to 091007-10.

The invention claimed is:

1. A computer implemented method of quantifying corneal axis strain in an eye comprising:
   using a computerized ultrasound imaging system to perform the following steps:
   acquire a plurality of ultrasound images of the eye;
   acquire radiofrequency data of the ultrasound images of the eye at multiple intraocular pressures;
   apply ultrasound speckle tracking to the radiofrequency data;
   identify tissue displacements corresponding to a change in intraocular pressure within the eye;
   quantify eye tissue strain from the tissue displacements; and
   prepare a corneal axis strain plot of a cornea within the eye.

2. The method of claim 1, wherein the corneal axis strain plot comprises values of strains normalized to intraocular pressure changes at positions within the tissue.

3. The method of claim 1, wherein the corneal axis strain plot comprises values of strains normalized to ocular pulse pressure.

4. The method of claim 1, wherein the corneal axis strain plot is analyzed to identify a weakest region of the tissue.

5. The method of claim 4, wherein the stiffness of the weakest region of the tissue is correlated with eye disease severity.

6. A computer implemented method of quantifying eye disease severity in an eye comprising:
   using a computerized ultrasound imaging system to perform the following steps:
   acquire a plurality of ultrasound images of the eye;
   acquire radiofrequency data of the ultrasound images of the eye at multiple intraocular pressures;
   apply ultrasound speckle tracking to the radiofrequency data;
   identify tissue displacements corresponding to a change in intraocular pressure within the eye;
   quantify eye tissue strain from the tissue displacements; and
   prepare a corneal axis strain plot of a cornea within the eye; and
   prepare a thickness map and a curvature map for the cornea;
   identifying a weakest area of the eye tissue;

and grade a level of eye diseases for the weakest area of the eye tissue.

7. The computer implemented method of claim 6, further comprising preparing a stiffness map of the eye tissue before grading the level of eye disease.

\* \* \* \* \*